W. H. LEE.
MEANS FOR CONTROLLING THE CASTERING OF THE FURROW WHEELS OF PLOWS.
APPLICATION FILED AUG. 26, 1910.
1,108,915.
Patented Sept. 1, 1914.
2 SHEETS—SHEET 1.
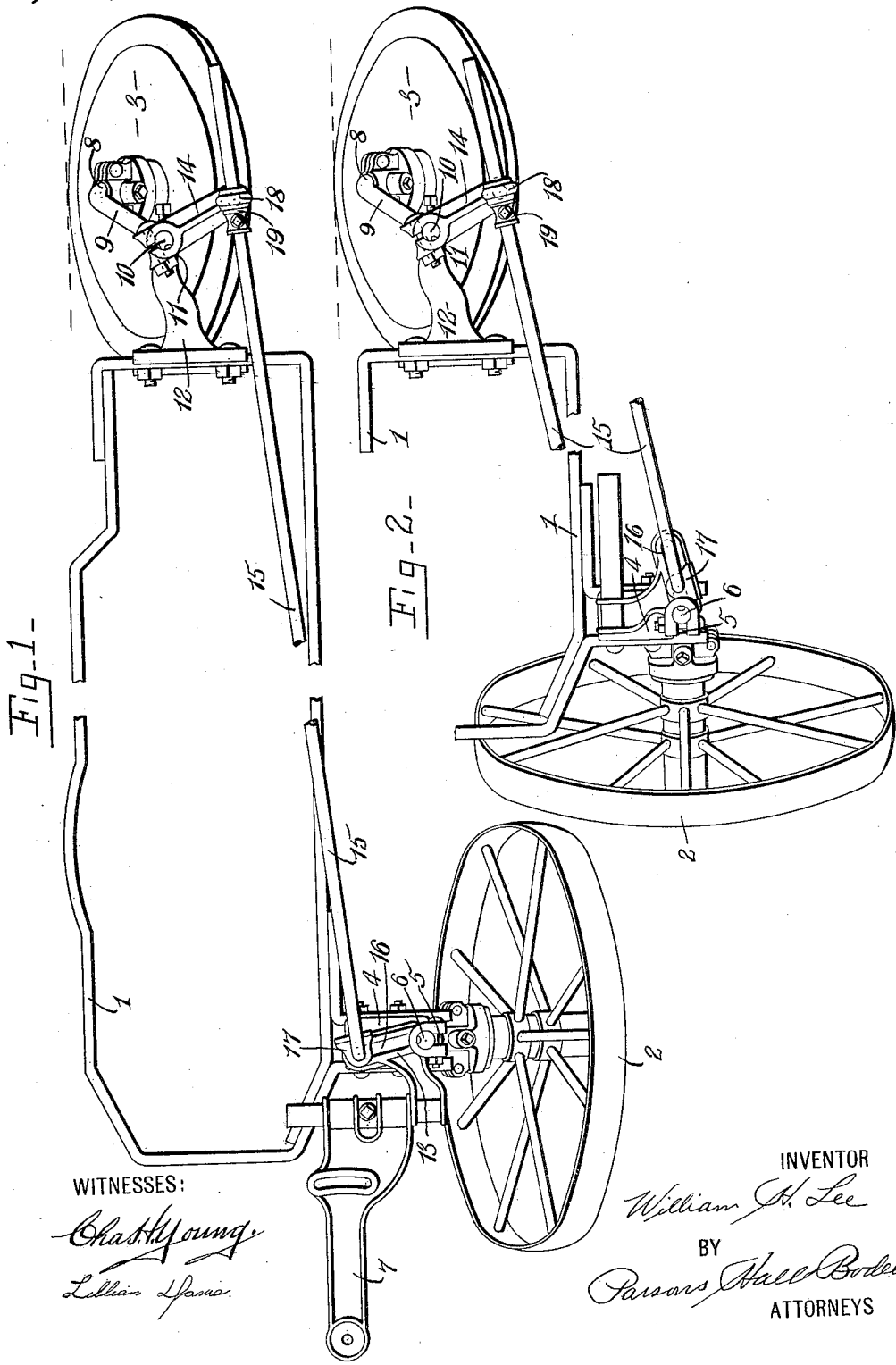

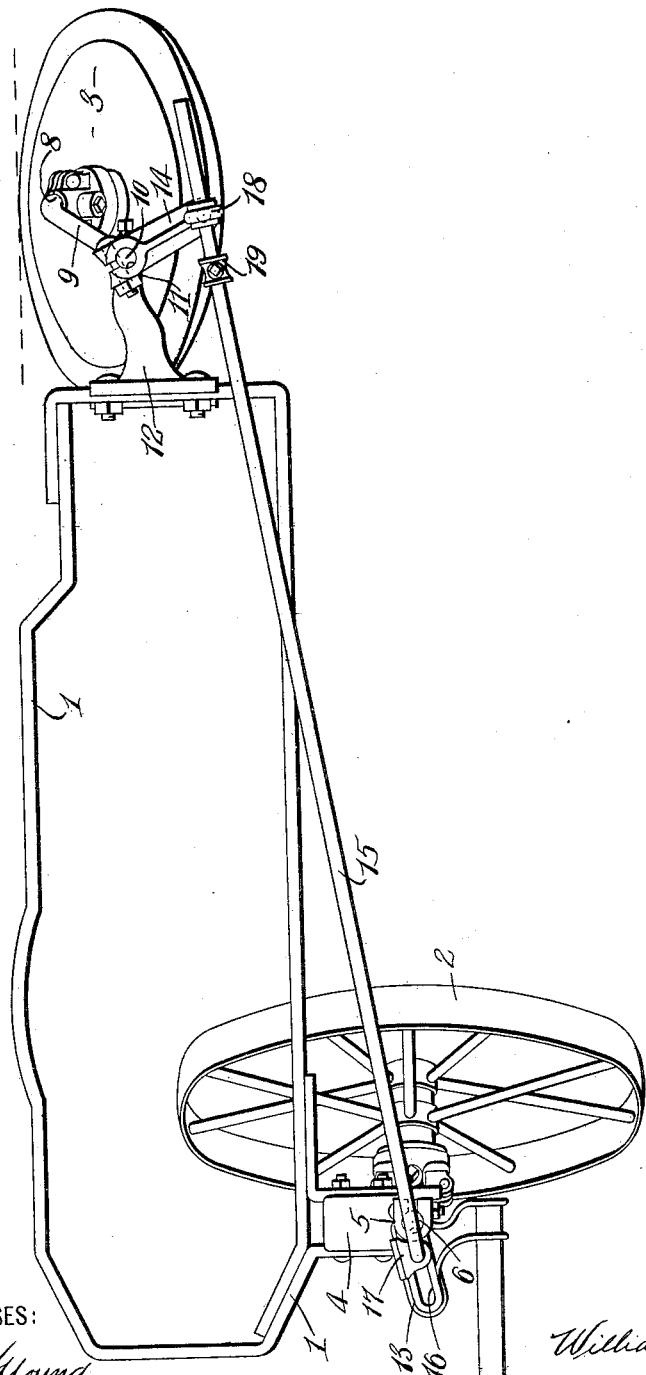

UNITED STATES PATENT OFFICE.

WILLIAM H. LEE, OF SYRACUSE, NEW YORK, ASSIGNOR TO THE SYRACUSE CHILLED PLOW COMPANY, OF SYRACUSE, NEW YORK, A CORPORATION OF NEW YORK.

MEANS FOR CONTROLLING THE CASTERING OF THE FURROW-WHEELS OF PLOWS.

1,108,915. Specification of Letters Patent. Patented Sept. 1, 1914.

Application filed August 26, 1910. Serial No. 579,124.

*To all whom it may concern:*

Be it known that I, WILLIAM H. LEE, of Syracuse, in the county of Onondaga and State of New York, have invented a certain new and useful Means for Controlling the Castering of the Furrow - Wheels of Plows, of which the following is a specification.

My invention relates to wheeled plows and particularly to means for controlling the castering of the rear furrow wheel; and it consists in the combinations and constructions hereinafter set forth and claimed.

In describing this invention reference is had to the accompanying drawing in which like characters designate corresponding parts in all the views.

Figure 1 is a plan, partly broken away, of a plow embodying my invention, parts of the plow having no bearing on this invention, being omitted. Figs. 2 and 3 are views similar to Fig. 1, illustrating the positions of the front and rear furrow wheels when the plow is turning, respectively, to the right, and to the left.

In so far as this invention is concerned, this plow comprises a frame 1 supported by front and rear furrow wheels 2 and 3 and by the usual land wheel, not shown, and connections between the front and rear furrow wheels whereby the rear wheel is normally held from castering out of the furrow upon the land, when the plow is traveling in a straight line, and is free to caster during the turning of the plow in either direction, so that it will remain in the furrow during the turning of the plow.

The land wheel, the earth turning element, and parts appurtenant thereto, may be of any desirable form, size and construction and as they form no part of this invention, and as their construction is well known, description and illustration thereof is thought to be unnecessary.

The frame 1 may be of any desirable form, size and construction, and is here shown as formed with a laterally-extending member 4 at its front end, having an upright bearing 5 in which is journaled an upright spindle 6 provided on the axle of the front furrow wheel 2. The tongue 7, or other member controlling the direction of the line of draft, is connected to the upright spindle 6 in order to turn the front wheel 2 during the turning of the plow at a corner. The front furrow wheel is here shown as on the left side of the plow frame, but may be located on the right side if the earth turning element turns a right hand furrow. The rear furrow or caster wheel 3 turns on an inclined axle 8, so that the wheel is staggered in the usual manner. Said axle is carried at the rear end of the forwardly - extending supporting member 9 which terminates in an upright spindle 10 journaled in the vertical bearing 11 associated with the frame, and here illustrated as formed at the end of a bracket 12 extending rearwardly from the frame 1.

The connection between the front and rear furrow wheels 2 and 3, comprises rock arms 13 and 14 mounted, respectively, upon the spindles 6 and 10 and extending laterally therefrom; and a rod 15 connecting the rock arms, the rod 15 having sliding or yielding connection with both of said arms. Said rod is movable at its front end toward and from the axis of said arm 13 and is movable forwardly from its normal position relatively to the rear rock arm 14. As shown, these rock arms extend in opposite directions and the front rock arm 13 is provided with a lengthwise slot 16, in which slides a member 17 pivoted to the front end of the rod 15; and the rear arm 14 is provided with a swiveled eye 18 through which the rod 15 extends. The eye is capable of sliding on the rod, rearwardly from its normal position and the rod is capable of sliding in the eye forwardly from its normal position. Forward movement of the eye from its normal position, Fig. 1, on the rod, is prevented by a shoulder 19 provided on the rod 15 and engaging the front side of said eye, so that the rear furrow wheel is held in its normal position, or in its position assumed when the plow is traveling in a straight line, said shoulder 19 being preferably adjustable along the rod 15.

The front rock arm 13 inclines forwardly from the spindle 6 when the plow is traveling in a straight line, so that its end is in front of a straight line, passing through the axis of the spindle 6 and perpendicular to the normal line of draft, and, during the turning of the plow to the left, said arm 13 moves forwardly into the position shown in Fig. 3. The rod 15 is normally prevented from movement by the forward pushing of the arm 14, due to the tendency of said rear furrow wheel to caster, by the fact that the member 17 is at the outer end of the slot 16 in the front arm 13, and said member 17 is in front of a straight line passing through the axis of the spindle 6 and perpendicular to the normal line of draft. During the turning of the plow to the left, Fig. 3, the rod 15 is pulled forwardly moving the shoulder 19 forwardly out of engagement with the front side of the eye 18 and thereby permitting the rear furrow wheel 3 to caster freely, so that it will remain in the furrow during the turning of the plow and will not be controlled in its movement by the front wheel. During the turning of the plow to the right, Fig. 2, the rock arm 13 swings rearwardly until the end thereof is in rear of a line passing through the axis of the spindle 6 and perpendicular to the normal line of draft, so that the member 17, owing to the engagement of the shoulder 19 and eye 18, and to the tendency of the wheel 3 to caster, will slide lengthwise of the slot 16 toward the spindle 6. When the parts are in the positions shown in Fig. 2 the tendency of the wheel 3 is to caster in such direction that the arm 14 moves away from the shoulder 19. Obviously owing to the sliding connections of the rod 15 with the front and rear rock arms 13 and 14, the rear furrow wheel will be normally held from castering and will be free to caster in the right direction to facilitate the turning of the plow whether the plow is turning to the right or left, so that said rear furrow wheel will remain in the furrow and will not be forced out of the furrow during the turning of the plow. Owing to the arrangement of the front arm 13 and the bearing 17 of the rod 15 at the end of the slot 16 farthest removed from the axis of such arm, the rod 15 is instantly released from holding force when the tongue 17 begins to turn from its position shown in Fig. 1 toward that shown in Fig. 3. When the plow is again traveling in a straight line after turning a corner to the left, the member 17 is again moved to the outer end of the slot 16 by the forward pushing of the rock arm 14. It will be understood that owing to the staggering of the furrow wheel 3, the wheel has a tendency to either follow in a straight line or turn out of the furrow in one direction, and such tendency to move out of the furrow is normally resisted by the shoulder 19, and that owing to the rod 15 and arms 13, 14, when the plow turns in one direction as to the right, as shown in Fig. 2, the furrow wheel is free to turn toward the left or the plowed land, owing to the fact that the arm 14 is free to move rearwardly while the frame of the plow is turning, and further that when turning to the left, as seen in Fig. 3, the shoulder 19 is pulled away from the eye 18 permitting the furrow wheel to caster freely to the right onto the unplowed land.

What I claim is:—

In a wheeled plow, a frame having front and rear upright bearings, a front furrow wheel having its axle provided with an upright spindle journaled in the front bearing, a rear wheel provided with an upright spindle journaled in the rear bearing, rock arms on the spindles and extending laterally in opposite directions from their spindles, the front rock arm normally extending slightly forwardly out of a transverse line extending through the axis of the front spindle and at a right angle to the normal line of draft, a rod connecting the rock arms and having a sliding and swivel connection with the rear arm, the sliding movement being in the direction lengthwise of the axis of the rod, the rod also having a bearing slidable along the front arm toward and from the axis thereof and being normally arranged at the outer end of the front arm in front of said transverse line, a shoulder on the rod and engaging with the rear arm to normally prevent forward sliding movement of the rear arm along the rod, and a tongue connected to the front spindle to turn the same during the turning of the plow in either direction, substantially as and for the purpose described.

In testimony whereof, I have hereunto signed my name in the presence of two attesting witnesses, at Syracuse in the county of Onondaga, in the State of New York, this 21st day of August, 1910.

WILLIAM H. LEE.

Witnesses:
 CHAS. H. YOUNG,
 GEO. A. NEWMAN.